United States Patent [19]
Oestreich

[11] 4,226,653
[45] Oct. 7, 1980

[54] METHOD FOR THE CONTINUOUS PRODUCTION OF AN OPTICAL TRANSMISSION ELEMENT

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 971,698

[22] Filed: Dec. 21, 1978

[30] Foreign Application Priority Data

Dec. 23, 1977 [DE] Fed. Rep. of Germany ......... 2757786

[51] Int. Cl.² .......................... B29C 27/24; G02B 5/14
[52] U.S. Cl. .................................. 156/73.5; 156/161; 427/163
[58] Field of Search ................... 156/53, 64, 73.5, 85, 156/161, 173; 427/163

[56] References Cited

FOREIGN PATENT DOCUMENTS 2505621 8/1975 Fed. Rep. of Germany.
2459997 6/1976 Fed. Rep. of Germany.
2519680 11/1976 Fed. Rep. of Germany.
2519684 11/1976 Fed. Rep. of Germany.
1476903 6/1977 United Kingdom.

*Primary Examiner*—James R. Hoffman
*Attorney, Agent, or Firm*—Hill, Van Santen, Steadman, Chiara & Simpson

[57] ABSTRACT

A method for the continuous production of an optical transmission element, which comprises a fiber received in a hose-like casing, characterized by applying a hose-like casing to a fiber to form an optical transmission element, heating the element, passing the element around a storage drum or drum with a sufficient number of loops to obtain the desired relationship between the fiber and casing, withdrawing the element from the storage drum or drum, cooling the withdrawn element to form a finished element and then winding the finished element on a reel or spool. Preferably, the storage drum or drum includes a conical support surface so that each succeeding loop of the element has a slightly smaller diameter and is guided axially on the support surface.

3 Claims, 1 Drawing Figure

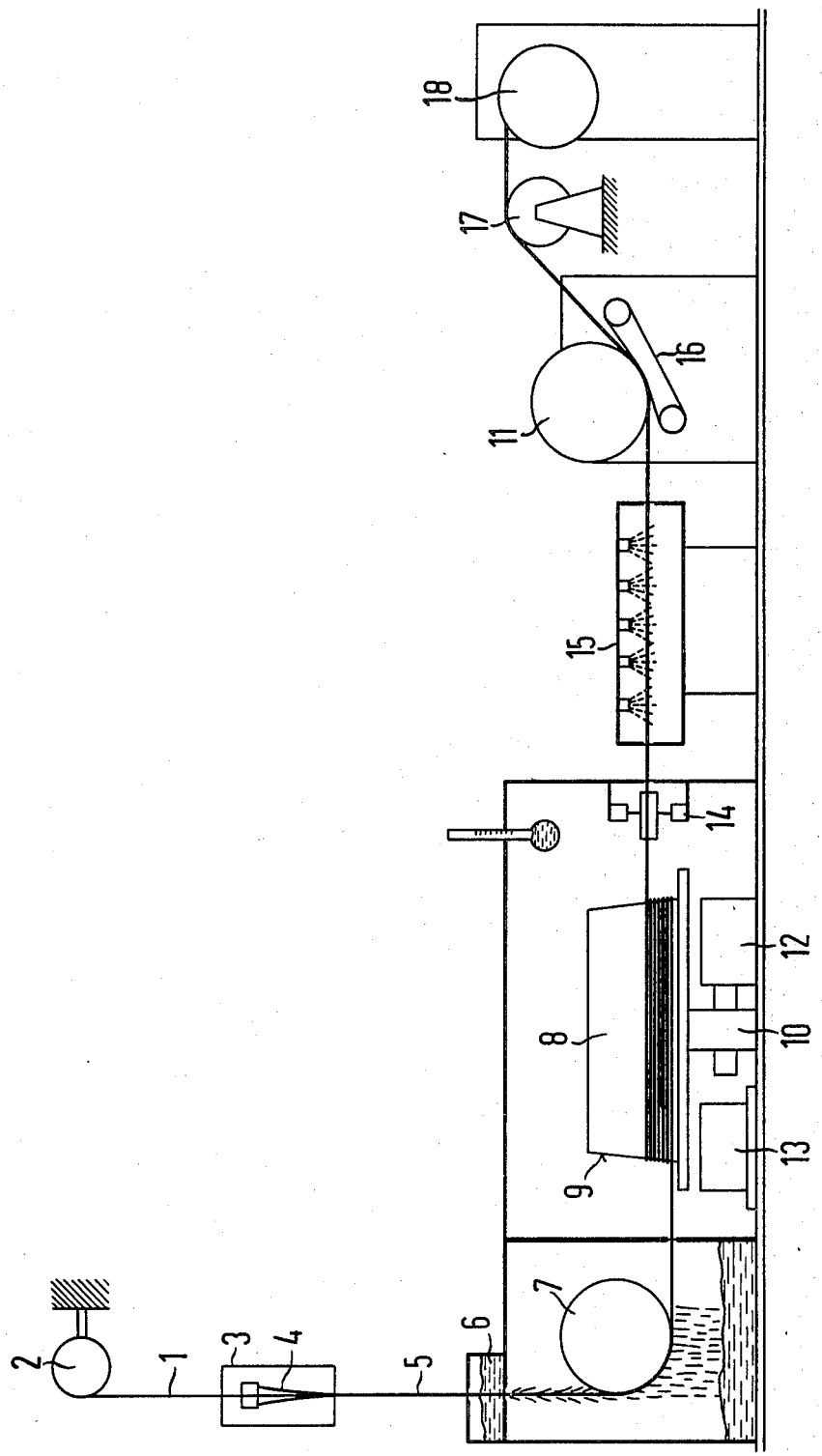

METHOD FOR THE CONTINUOUS PRODUCTION OF AN OPTICAL TRANSMISSION ELEMENT

BACKGROUND OF THE INVENTION

The present invention is directed to a method for the continuous production of an optical transmission element consisting of a light waveguide fiber which is loosely received in as hose-like casing with the fiber having an excess length relative to the length of the casing and a storage drum used in the method.

Optical transmission elements, which each consist of a light waveguide fiber, which is loosely received in a hose-like casing with the fixer having an excess length, over the length of the casing are described and disclosed in German Offenlegungsschrift Nos. 2,459,997; 2,519,680 and 2,519,684. In these known optical cables, the optical transmission element with the tension proof elements are connected only in specific spacings which connections are approximately in a point-shape.

With a different embodiment, which is described in German Offenlegungsschrift No. 2,505,621, a casing is extruded around the optical transmission element and rapidly cooled after the completion of the extrusion so that the casing shrinks in a longitudinal direction and the optical transmission element is situated in the casing in a non-stretched fashion and is free to move therein. This first casing for its part is then surrounded by a second casing consisting of synthetic material whose interior diameter is considerably larger than the exterior diameter of the first casing.

In another known method for the production of the optical transmission element, the optical transmission element is wound at an increased, and definite temperature on a storage reel and is then cooled to room temperature. After the cooling of the casing to room temperature, the light waveguide fiber is provided with the necessary excess length relative to the casing prior to the winding of the finished element on a reel of spool. However, the known method requires large volume storage reels, which are very cumbersome for handling.

SUMMARY OF THE INVENTION

The present invention is directed to a method or process for continuously providing an optical transmission element comprising a light waveguide fiber received in a hose-like casing which element can be wound into a normal volume spool or drum.

To accomplish these tasks, the present invention comprises a method for the continuous production of the optical transmission element comprising a light waveguide fiber loosely received in a hose-like casing with the fiber having an excess length relative to the casing. The method comprises the steps of pulling the fiber from a storage reel, controlling the speed of the removal from the storage reel by applying a braking force to the reel; surrounding the fiber with a hose-like casing to form an optical transmission element; heating the element to a temperature, which is required for creating a necessary excess length between the fiber and the casing; passing the heated element around a tempered drum or storage drum with a sufficient number of loops so that the hose-like casing and the light waveguide fiber are tightly coupled to one another due to friction and as a consequence of the friction, the speed of the casing on a support surface of the drum is the same as the fiber speed as the element is removed from the drum, removing the element from the drum; cooling the removed element to form a finish element; and then winding the finishing element on a spool.

The drum, which is used in the method, has a conical support surface so that each of the succeeding loops has a slightly smaller diameter to facilitate the axial displacement of the loops from one another during the passing of the element around the drum. Thus as a loop is formed, it is guided axially along the surface as the next loop is being formed. The drum advantageously can be provided with a mean for controlling the speed of rotation which include a revolution-stable drive which operates at a slightly slower speed than the pull-off speed for the element and is connected by a free-wheel clutch to the drum to enable the starting up of the process or method. The mean for controlling the speed of the drum also includes a traveling field drive for rotating a drum during production. The traveling field drive, which preceeds a strongly under synchronously, is stable as to torque and effects the speed of the drum when a great tension exists on the element. The field drive is controlled by a tension sensor that senses the tension in the element being removed from the drum and the drive is used to compensate for all additional forces formed by the means on the drum.

BRIEF DESCRIPTION OF THE DRAWINGS

The FIGURE is a schematic view of the apparatus utilized in the present invention.

DESCRIPTION OF THE PREFERRED EMBODIMENT

The principles of the present invention are particularly useful when incorporated in a device illustrated in the FIGURE. A light waveguide fiber 1 is pulled off a storage spool or reel 2, which reel is provided with a brake to control the speed of removal. After removal of the fiber 1 from the reel 2, the fiber is passed through a worm press 3, where the fiber is provided with a surrounding hose-like casing 4 which loosely encases the fiber 1. The fiber 1 and casing 4 form the optical transmission element 5.

The element 5 is air-cooled to complete the formation process. Then the element 5 is brought to an excess temperature necessary for creating the necessary excess length between the fiber and the casing by means of a heated water bath 6. With a presently existing thermal coefficient of expansion of $0.5 \times 10^{-4} K^{\circ -1}$, the temperature of $RT + 20K^{\circ}$, which is required to obtain a 0.1% excess length, will be about 40° C.

The element 5 after passing through the bath 6 is deflected around a roller 7 and then proceeds to be freely supported on a storage drum or drum store 8, which is air-tempered or heated, has a diameter of 1400mm, and has the same temperature as the water bath. Thus, an element will, for example a 0.95/1.4mm diameter will have a length deficit of $0.4/1400 = 2.9 \ 19 \ 10^{-4}$ and this deficit is deducted from the excess length which is to be obtained. In accordance with experience, after the element has been looped around approximately 7 loops or windings on a storage drum 8, the element speed on the inside diameter engaging the drum surface and the fiber speed are coupled together due to friction. In order to obtain a transfer or the laying of the element windings on the storage drum 8, the drum store is slightly conical as illustrated at 9 so that each loop is guided or moves axially upward after being applied to provide room for the next following loop that is being applied.

The storage drum 8 is provided with means for driving which includes a freewheel clutch 10 which connects a rotation stable drive 12 to the drum. The rotation drive 12 operates at several percent slower than the drawing-off device 11 for removing the element 5 from the storage drum 8 and the drive 12 is used during start up to bring the storage drum 8 to the desired speed of rotation. In addition, the means for controlling includes a torque stable traveling field drive 13 whose momentum is controlled by a tension sensor 14 and is utilized to control the speed of rotation of the drum, when a great tension exists which will cause slippage in the device 11.

Thus, a slightly concial storage drum which, has the loops drawn thereon will compensate for any frictional torque and if a sufficiently large number of winding are provided, the drum contributes to a safe mechanical coupling between the fiber and the casing of the element and a definite excess length is provided by the definite cooling of the fiber casing. Thus, the stretching of the still warm however, already sufficiently stable casing of the element, which casing is at 50° C., by means of frictional forces in the storage support is prevented.

As the element 5 is pulled off the storage drum 8 by the device 11, the element passes through the tension sensor 14 and then through a water cooling bath 15. From the cooling bath 15, the element passes through the rotation-stable drawing off device 11, which has a pressure belt 16. After passing through the device 11 and belt 16, the finished element 5 finally reaches a winding device which includes a winder 18 and a tension sensor 17. The winding device winds the element onto a storage reel or spool.

Since a strong casing with reproducible properties is desirable for the inventive method, a careful selection of materials being utilized is important. For example, the interior layer of the casing may be made of a fluorine-polymer and an example of this polymer is sold under the trade name of "HALAR". The outer layer or exterior layer of the casing can be polyester.

Although various modifications may be suggested by those skilled in the art, it should be understood that I wish to embody within the scope of the patent granted hereon, all such modifications as reasonably and properly come within the scope of my contribution to the art.

I claim:

1. A method for the continuous production of an optical transmission element comprising a light waveguide fiber loosely received in an hose-like casing with the fiber having an excess length relative to the length of the casing, said method comprising the steps of pulling the fiber from a storage reel; controlling the speed of removal from the reel by applying a braking force to the reel; surrounding the fiber with a hose-like casing to form an optical transmission element; heating the element to a temperature, which is required for creating a necessary excess length between the casing and the fiber; passing the heated element around a tempered drum with a sufficient number of loops so that the hose-like casing and the light waveguide fiber are tightly coupled to one another due to friction and as a consequence of the friction, the speed of the casing on a support surface of the drum is the same as the fiber speed as the element is removed from the drum; removing the element from the drum; cooling the removed element to form a finished element; and then winding the finished element on a spool.

2. A method according to claim 1, wherein the step of passing the heated element around a tempered drum includes utilizing a drum having a slightly conical surface so that each following loop has a slightly smaller diameter.

3. A method according to claim 1, which includes sensing the tension in the element as it is removed from the drum and controlling the speed of rotation of the drum to maintain a desired tension in the element to prevent stretching thereof.

* * * * *